United States Patent
Brinner

(10) Patent No.: US 7,852,839 B2
(45) Date of Patent: Dec. 14, 2010

(54) METHOD AND DEVICE FOR THE PROVISION, IN AN ORDER ACCORDING TO ATM CHANNELS, OF ATM CELLS AT AN INTERFACE ARRANGED BETWEEN A FIRST AND A SECOND NODE OF A TRANSMISSION SYSTEM

(75) Inventor: Helge Brinner, Berlin (DE)

(73) Assignee: Tektronix, Inc., Beaverton, OR (US)

( * ) Notice: Subject to any disclaimer, the term of this patent is extended or adjusted under 35 U.S.C. 154(b) by 890 days.

(21) Appl. No.: 11/442,498

(22) Filed: May 26, 2006

(65) Prior Publication Data

US 2006/0268894 A1 Nov. 30, 2006

(30) Foreign Application Priority Data

May 27, 2005 (EP) .................................. 05011503

(51) Int. Cl.
*H04L 12/28* (2006.01)
*H04L 12/66* (2006.01)

(52) U.S. Cl. .................. 370/389; 370/395.52; 370/351; 370/401; 370/467; 370/231

(58) Field of Classification Search .......... 370/230–467
See application file for complete search history.

(56) References Cited

U.S. PATENT DOCUMENTS

| | | | | |
|---|---|---|---|---|
| 5,438,571 A | * | 8/1995 | Albrecht et al. | 370/408 |
| 5,446,726 A | * | 8/1995 | Rostoker et al. | 370/232 |
| 5,625,825 A | * | 4/1997 | Rostoker et al. | 710/242 |
| 5,640,399 A | * | 6/1997 | Rostoker et al. | 370/392 |
| 5,654,962 A | * | 8/1997 | Rostoker et al. | 370/232 |
| 5,668,809 A | * | 9/1997 | Rostoker et al. | 370/392 |
| 5,726,985 A | * | 3/1998 | Daniel et al. | 370/382 |
| 5,802,287 A | * | 9/1998 | Rostoker et al. | 370/395.5 |

(Continued)

FOREIGN PATENT DOCUMENTS

EP 1727315 A1 11/2006

(Continued)

*Primary Examiner*—Ayaz R Sheikh
*Assistant Examiner*—Venkatesh Haliyur
(74) *Attorney, Agent, or Firm*—Matthew D. Rabdau; Michael J. Fogarty, III

(57) ABSTRACT

Embodiments of the present invention relate to a method for providing ATM cells at an interface arranged between a first and a second node of a transmission system, in an order according to ATM channels. Embodiments of the method comprise determining address information for a specific ATM cell; verifying, whether the address information has already been recorded in a table, in which the address information is mapped onto a channel ID (CH), by providing the address information to a CAM memory; if the address information has already been recorded in the table assigning the channel ID (CH) output from the CAM memory to the ATM cell for further processing; and if the address information has not yet been recorded in the table, indicating that the address information has not yet been recorded, assigning a free channel ID (CH) to the address information, recording said channel ID (CH) or the address information in the table; and providing the ATM cells, in an order according to channel IDs (CH), for further processing. Also provided is an apparatus comprising a processor and a CAM memory connected together to implement the present method.

12 Claims, 3 Drawing Sheets

U.S. PATENT DOCUMENTS

| | | | | |
|---|---|---|---|---|
| 5,838,904 | A * | 11/1998 | Rostoker et al. | 709/250 |
| 5,867,480 | A * | 2/1999 | Thomas et al. | 370/230 |
| 5,884,297 | A * | 3/1999 | Noven | 370/395.3 |
| 5,963,543 | A * | 10/1999 | Rostoker et al. | 370/232 |
| 6,201,755 | B1 * | 3/2001 | Pillar et al. | 365/230.01 |
| 6,442,170 | B1 * | 8/2002 | Perlman et al. | 370/401 |
| 6,510,229 | B1 * | 1/2003 | Geile | 380/235 |
| 6,535,512 | B1 * | 3/2003 | Daniel et al. | 370/395.1 |
| 6,603,766 | B1 | 8/2003 | Zifroni et al. | |
| 6,614,796 | B1 * | 9/2003 | Black et al. | 370/403 |
| 6,618,376 | B2 * | 9/2003 | Rumer | 370/395.1 |
| 6,728,261 | B1 * | 4/2004 | Sasson et al. | 370/466 |
| 6,771,646 | B1 * | 8/2004 | Sarkissian et al. | 370/392 |
| 6,788,691 | B1 | 9/2004 | Caves et al. | |
| 7,009,985 | B2 * | 3/2006 | Black et al. | 370/403 |
| 7,133,417 | B1 * | 11/2006 | Kao et al. | 370/467 |
| 7,158,579 | B2 * | 1/2007 | Hottinen | 375/267 |
| 7,181,544 | B2 * | 2/2007 | Vangal et al. | 709/250 |
| 7,237,036 | B2 * | 6/2007 | Boucher et al. | 709/245 |
| 7,362,769 | B2 * | 4/2008 | Black et al. | 370/404 |
| 7,366,190 | B2 * | 4/2008 | Black et al. | 370/406 |
| 7,385,972 | B2 * | 6/2008 | Black et al. | 370/389 |
| 7,430,171 | B2 * | 9/2008 | Black et al. | 370/235 |
| 7,450,500 | B2 * | 11/2008 | Black et al. | 370/230 |
| 7,471,691 | B2 * | 12/2008 | Black et al. | 370/403 |
| 2002/0054600 | A1 | 5/2002 | Tanaka et al. | |
| 2002/0071390 | A1 * | 6/2002 | Reeves et al. | 370/235 |
| 2002/0105950 | A1 * | 8/2002 | Dapper et al. | 370/386 |
| 2002/0141395 | A1 | 10/2002 | Chang | |

FOREIGN PATENT DOCUMENTS

| | | | |
|---|---|---|---|
| EP | 1727319 | A1 | 11/2006 |
| EP | 1727320 | A1 | 11/2006 |

* cited by examiner

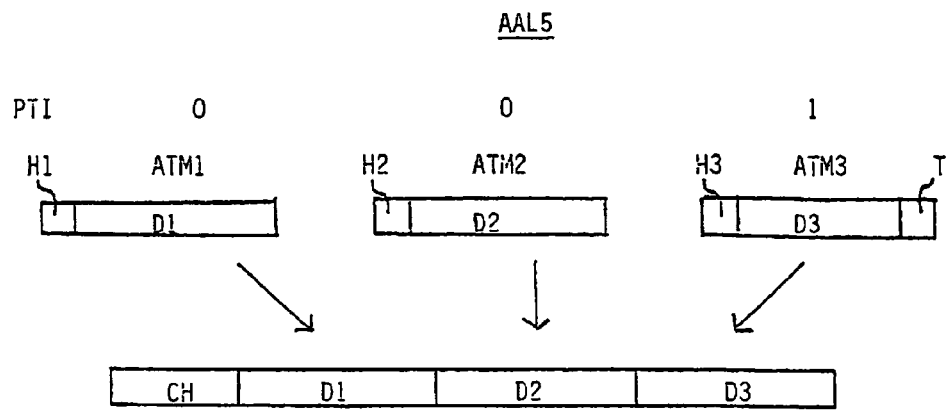
Fig. 1 (SdT)
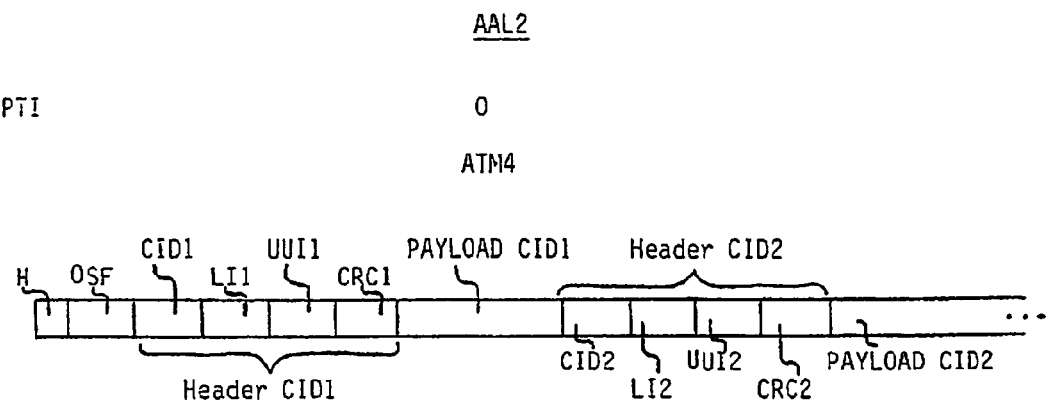
Fig. 2 (SdT)
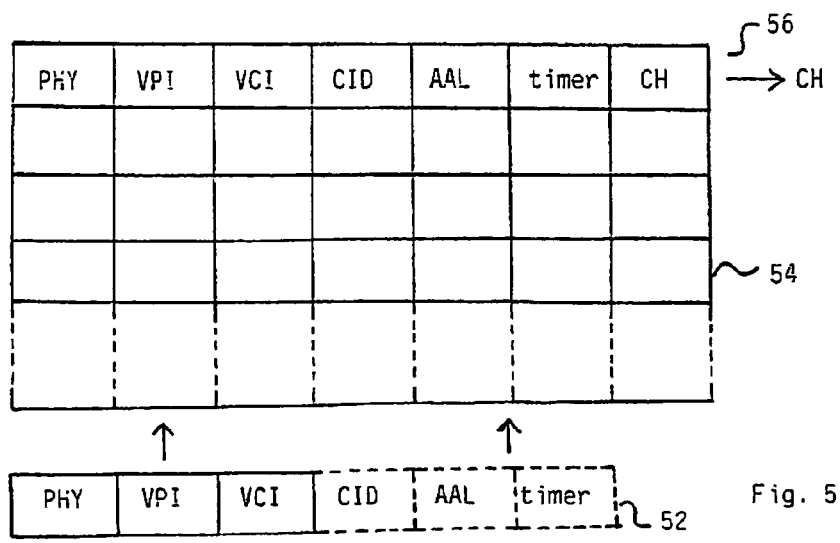
Fig. 5

METHOD AND DEVICE FOR THE PROVISION, IN AN ORDER ACCORDING TO ATM CHANNELS, OF ATM CELLS AT AN INTERFACE ARRANGED BETWEEN A FIRST AND A SECOND NODE OF A TRANSMISSION SYSTEM

BACKGROUND

The present invention relates generally to ATM (Asynchronous Transfer Mode) transmission, and more particularly to a method and a device for the provision of ATM cells at an interface arranged between a first and a second node of a transmission system.

As a rule, in ATM systems, the data are transmitted in cells having a length of 53 bytes, whereby 5 bytes are reserved for the header and 48 bytes for the payload. Each cell has address information comprising two address identifiers, namely the VPI (Virtual Path Identifier) and the VCI (Virtual Channel Identifier). Moreover, the cell header comprises a Payload Type Identifier (PTI), which comprises three bits. According to the OSI reference model, there is envisaged a layer, namely the so-called ATM Adaption Layer (AAL), which controls the transmission of large data packets. This involves the use of two different encoding rules, namely AAL2 and AAL5.

FIG. 1 shows, as an example, the known configuration of ATM cells for AAL5: Each ATM cell ATM1, ATM2, ATM3 exhibits a header H1, H2, H3 and a payload D1, D2, D3. The last cell of a transmission further comprises a trailer T. In the case of AAL5, said last cell is characterised by the Payload Type Identifier "001" or "011". For all other cells, the Payload Type Identifier has the value of "000" or "010" for AAL5. The ATM cells ATM1, ATM2, ATM3, which belong to the same ATM channel are grouped together, see FIG. 1. Accordingly, for AAL5, all information having the same VPI/VCI address is designated as belonging to an ATM channel CH.

In the case of AAL2, a channel having the same VPI/VCI address can contain up to 255 sub-channels, which are marked by so-called CIDs (Channel Identifiers). Sub-channels having different CIDs relate to the transmission of information for different subscribers. The Payload Type Identifier PTI for each ATM cell ATM4 in the case of AAL2 is "000". With respect to FIG. 2, the ATM cell ATM4 first of all exhibits a header, which is followed by an OSF (Offset Field). The Offset Field indicates, where the first CID, in the present case CID1, is positioned. This is necessary because CIDs may be cell-overarching. CID1 is followed by field LI1, which indicates the length of the first payload "Payload CID1". Next, there follows field UUI1 and field CRC1, which reflects the result of a cyclic redundancy check, i.e. a cyclic block test, across the header of CID1, which contains fields CID1, LI1, UUI1 and CRC1. After payload CID1 there follows the header of CID2 with fields CID2, LI2, UUI2, CRC2. This is followed by payload CID2, etc.

The encoding rule used for the transmission is determined in the UMTS network e.g. by the RNC node, depending on which requirements were addressed to it by a subscriber, e.g. by a mobile phone, particularly speech transmission or data transfer from the Internet. A monitoring apparatus, which serves monitoring purposes at the interface, therefore does not become aware of the agreed encoding rule without the finding, configuring and decoding the channels on which the control information (Control Plane Data) are transmitted.

In the prior art, measuring apparatuses, particularly for monitoring transmissions on ATM channels at an interface arranged between a first and a second node of a transmission system, therefore require manual configuration of the ATM channels. In this process, the user is asked to manually enter the VPI/VCI addresses and the associated AAL type of the channel he wants to monitor. In the case of AAL2, it is also necessary to configure all CIDs manually.

In order to check whether the address combination of the current ATM cell has already been recorded in the table, there are used in the prior art table search algorithms, which require an extremely fast and hence very expensive RAM memory and a high processor capacity, because the algorithm for the search itself is formulated in software.

This manual configuration exhibits two major disadvantages: Once made, a manual configuration is definite. An adaptation to changes in the configuration of the interface, which the user monitors, e.g. during the opening of new channels and the closing of existing channels, is not made. Also, the user does not know in most cases, which ATM channels exist at the interface to be monitored. By using the time-consuming manual configuration, which is also afflicted with errors, it is not possible to monitor channels at the interface whose VPI/VCI addresses are not known to the user.

SUMMARY

Accordingly, embodiments of the present invention consist of one, or more, of the following three different aspects: 1. Measures to achieve the high processing speed required for permanent monitoring for the provision, in an order according to ATM channels, of ATM cells; 2. Measures to enable autoconfiguration; and 3. Measures that allow the permanent provision, in an order according to ATM channels, of ATM cells, even if the storage possibilities are limited.

The solution is based on the realisation that the necessary processing speed can be reached if a CAM (Content Addressable Memory) memory is used and if there is applied to the CAM memory, as the data input signal, the address information of the ATM cell just applied for evaluation, whereby the CAM memory is organised such that it then provides, as the address output signal, the channel ID, if it exists.

Within the meaning of the invention described below, channels having the same VPI/VCI/CID address are also referred to as ATM channels.

A CAM memory with special functional blocks, especially additional mask registers and a direct SRAM interface that may be used to provide an index as a direct pointer for addressing the SRAM, is referred to as an NSE (Network Search Engine). An NSE by the company IDT of the type 75N42102, for example, allows 80 million queries per second. In order to make such a large number of queries possible in the first place, there is envisaged for an embodiment of the invention that state machines are coupled at the input and the output of the CAM memory. Accordingly, there is used in step b) a main state machine for the generation of a request, for which the data input signal is coupled to the CAM memory, and in step b1) and in step b2) a result state machine for recording of the result of the request.

For the aforementioned module by IDT, it is possible, provided the main state machine, the CAM memory and the result state machine are coupled with each other to a common clock signal, for a maximum of one request to be generated by the main state machine every two clock cycles and applied to the CAM memory for processing, whereby the CAM memory requires nine clock cycles for processing a request, which means that it takes nine clock cycles until the result is made available at the result state machine. According to an embodiment, it is therefore envisaged that the result state machine collects the results made available by the CAM memory, so that they can be assigned to the corresponding requests by the main state machine. Thanks to this measure, there can be implemented the maximum processing speed of the CAM memory, without first having to wait for nine clock cycles after a request until the result would be made available at the result state machine, before the main state machine can address the next request to the CAM memory.

Another embodiment relates to the determination of at least one transmission parameter of an ATM transmission and is based on the realisation that, for the decision in principle as to whether there exists an AAL2 or an AAL5 transmission, the Payload Type Identifier can be evaluated in conjunction with a criterion only fulfilled by AAL2. This way, the basis for the autoconfiguration of an apparatus has been provided.

As a criterion that needs to be checked in this process, one or several from the following selection must be taken consideration: the CRC5 check (i.e. the cyclic block test) across the first CID determined by the OSF field is valid; the parity check across the OSF field is valid; the value of the UUI field of the first CID is smaller than 27; the first CID field does not equal 0x00.

Another embodiment is characterised in that, if the at least one criterion for AAL2 is fulfilled, the CIDs are subsequently determined. To this end, the OSF field of the current ATM cell is read out. Next, there is read as per the position, within the cell, determined by the OSF field, the first CID, and thereafter the first LI field. Using the LI field and the position within the cell, there is determined an offset value that allows the second CID to be read out. If said CID exists (value not equal to 0), the next offset value is determined. Thereafter, the next CID is read out. These steps are repeated until all CID fields have been recorded.

For AAL5, there is entered into the table in accordance with the first solution aspect, together with the associated AAL type and the assigned channel ID, every VPI/VCI address combination. Optionally, there may also be assigned a timer value relating to a time signal. For AAL2, there is additionally assigned a channel ID to provide a VPI/VCI/CID address combination for the table, here too, the associated AAL type and, optionally, an associated timer value are saved. The function of such a timer value will be explained in more detail below.

Within the meaning of the invention described below, channels having the same VPI/VCI/CID address are also referred to as ATM channels.

In another embodiment, a cyclic counter is used, which, in each case, after a predetermined length of time, continues counting one time step further, whereby there are stored in the table, together with the channel ID and the address information, the associated counter position of the recording of the relevant channel ID and address information, or their updates. In this way, there is provided the possibility that the oldest entries, which in the case of a cyclic timer correspond to the current counter position minus 1, can be queried and deleted. If the predetermined length of time is selected so that, as far as the length of time is concerned, all transmissions up for consideration can be recorded with respect to the value range of the counter position, it can be ensured in this way that a permanent monitoring of an ATM transmission at the interface is made possible, despite a table that is physically limited in terms of its scope.

This method can be implemented using a CAM memory for the table. The CAM memory may be integrated into an NSE to provide opportunities to create a mask with which the desired values of the counter position to the CAM memory can be generated for a query.

In an embodiment of the present invention the entries having a specific counter position are deleted as follows: First, there is generated for the CAM memory a query mask, which contains at least the specific counter position. Then, all entries with the specific counter position are called up in the CAM memory and thereafter, all these entries are deleted. In connection with a state machine arranged on the input side, it is possible to delete the corresponding channels from the table via a minimum of clock cycles of a clock, to which such a state machine, which is arranged at the input, and the CAM memory are synchronised.

The embodiments presented in connection with the methods according to the present invention apply accordingly to the devices according to the present invention. It should be pointed out in particular that the methods and devices according to the present invention can be combined with each other in any way.

Aspects of the various embodiments of the present invention will become apparent from the following detailed description when read in conjunction with appended claims and attached drawings.

BRIEF DESCRIPTION OF THE DRAWINGS

FIG. 1 is a schematic representation the configuration, known from prior art, of a message consisting of several ATM cells, which is transmitted on an ATM channel using AAL5;

FIG. 2 is a schematic representation the configuration, known from prior art, of a message consisting of several ATM cells, which is transmitted on an ATM channel using AAL2;

FIG. 5 is a schematic representation of a query for one embodiment of a measuring apparatus according to the present invention, in which the table is realised by a CAM memory.

DETAILED DESCRIPTION

Figure 3:
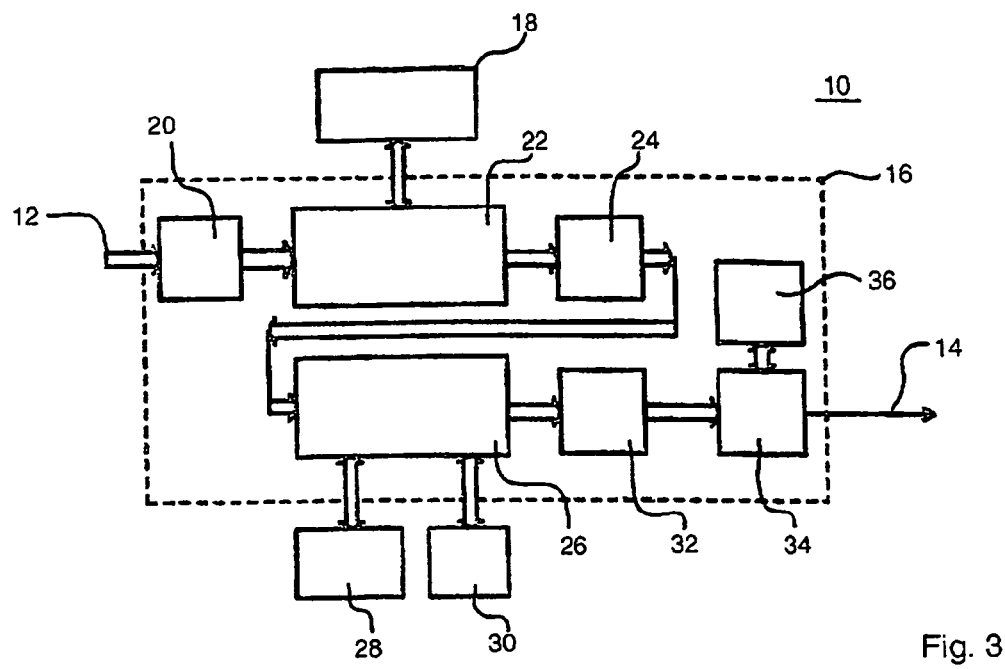
FIG. 3 is a block diagram representation, the configuration of a device according to the present invention.

FIG. 3 shows in a schematic representation the configuration of a device according to the present invention, whereby there is provided an ATM data stream on a physical interface, for example UTOPIA-II, at input 12. As will be specified in more detail with reference to FIG. 5, there is provided in the present case an ATM data stream via four different physical interfaces, PHY1 to PHY4. For the provision of data in a order according to ATM channels at output 14 of device 10, there are essentially two components acting in concert, namely a processor 16, which may be implemented using an FPGA (Field Programmable Gate Array) and an NSE 18, which comprises a CAM memory. In alternative embodiments, the processor may be implemented using an ASIC (application specific integrated circuit), discrete logic, or a general purpose processor funning software, or firmware. In this process an NSE is a specialised form of a CAM memory. While a normal RAM (Random Access Memory) is addressed at its input and provides, at its output, the data that are stored under this address, there can be applied to a CAM memory a query with known data, whereby the CAM memory provides at its output the associated address under which said data are stored. This address is hereinafter referred to as an index and provides the channel ID 'CH', i.e. the channel to which the ATM cell belongs. Therefore, in the present case, a CAM memory is used for the hardware implementation of a table search algorithm.

A DPR (Dual-Ported RAM) 20 serves to provide data to the real autoconfiguration unit 22. The autoconfiguration unit 22 acts in concert with the NSE 18, which will be described in more detail below with reference to FIG. 4. At the output of the autoconfiguration unit 22 there is envisaged a DPR 24, which provides the ATM cells, for which an allocation to a ATM channel has been possible. These are coupled to an AAL reassembly device 26, which acts in concert with a DDR-SDRAM (Synchronous Dynamic Random Access Memory) 28 and a SRAM (Static Random Access Memory) 30 to perform the reassembly, whereby there are stored, in the SRAM 30, parameters for the reassembly process. In this process, the DDR-SDRAM 28 takes over the buffering of the large data quantities occurring during the assembly. Via an optional filter unit 32 the data are transmitted to a GBE (Gigabit Ethernet) interface 34, which acts in concert with a processor 36, whereby at the output 14 of the GBE interface 34 the data are ordered according to channels and made available in a configuration which is such that they can be transported on a gigabit Ethernet. The processor 36 may be implemented as a power PC. It is possible to search in the filter unit 32 for specific protocol contents, i.e. for specific patterns, so that only these specific patterns are made available at the output. Since in the present case, the named parameters of the channel in question are stored directly in the NSE, it is possible to dispense with a further SRAM.

Figure 4:
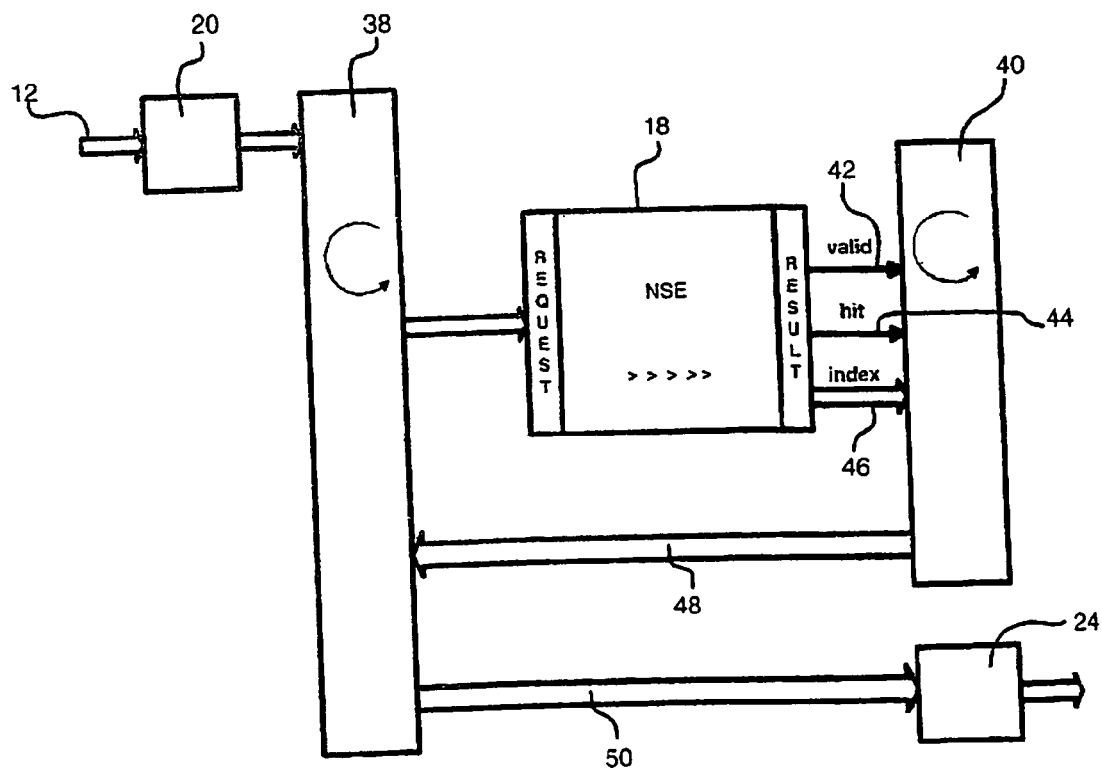
FIG. 4 is a detailed schematic representation of a partial area of FIG. 3.

FIG. 4 shows in a detailed representation a cutout from FIG. 3. Here the autoconfiguration device 22 comprises a main state machine 38 and a result state machine 40, which acts in concert with the NSE 18 to perform the autoconfiguration. An NSE 18 is a pipelined device, i.e. a device, which works in a time-interleaved manner. In a special embodiment it accepts 80 million requests per second, i.e. a request every two clock cycles of a common clock signal, while nine clock cycles are needed until the result of the request is made available at the output of the NSE 18. With the use of two state machines it is not necessary, before applying a new query, to wait for the result of the previous query. It is rather possible to exploit in this way the maximum processing speed of the NSE 18. According to the representation of FIG. 4, the main state machine 38 generates all queries to the NSE at intervals of two clock cycles. The result state machine 40 collects the results in the corresponding sequence. In this process, there is applied via line 42 a signal to the result state machine 40, which informs the result state machine 40 that there is a new result. Via line 44 there is supplied a positive signal to the result state machine 40, if the query was successful. At the same time, the address of the entry is supplied to the result state machine 40 via line 46. A simultaneous positive signal on lines 42 and 44 therefore informs the result state machine 40 that there is the result of a successful query, while a positive signal on line 42 and a negative signal on line 44 informs the result state machine 40 that the query was unsuccessful, i.e. that the queried data could not be found. Via a line 48, the result state machine 40 makes available the results of the query to the main state machine 38. Thereupon the main state machine 38 generates in the NSE 18 new entries for queries that were unsuccessful, i.e. that did not provide any hits. Moreover, via line 50, the main state machine 38 makes available to the DPR 24 for further processing the ATM cells, in an order according to channels, i.e. both for channels, which already existed in the NSE 18, and also for channels, for which new entries had to be generated in the NSE 18.

A detailed function of the main state machine 38 is provided as follows:

For each ATM cell the following steps are executed:

a) First, the DPR 20 is asked whether there are new ATM cells for processing.

b) If a new ATM cell is available, the number of the physical input connection PHY of the cell is recorded, and the cell is provided with a time stamp;

c) Next, a HEC (Header Error Correction) check is performed, whereby the CRC 8 is calculated via the header of the cell. If the HEC check fails, the cell is discarded. Cells with a failed HEC check, and cells that have completed an HEC check successfully, are counted according to the input connections PHY.

d) Then, the VPI/VCI address information is taken from the cell. Because of the synchronisation to the cell start and the cell end, this is possible.

d1) Next, a query to the NSE for the present PHY/VPI/VCI combination is generated.

d2) Then, a query to the NSE for the present AALx combination is generated. Here, AALx indicates that for this combination of PHY/VPI/VCI the AAL is not yet known and therefore has to be determined as described in more detail below.

d3) Then, a query to the NSE for the present PHY/VPI/VCI/AAL5 combination is generated.

d4) Then, a query to the NSE for the present PHY/VPI/VCI/AAL2 combination is generated.

d5) Finally, a query to the NSE for the present PHY/VPI/VCI/AALy combination is generated. Here, AALy indicates that for this combination of PHY/VPI/VCI, AAL type 5 is assumed and used, but that it has not unequivocally been recognised.

e) Thereafter, a synchronisation is established with the result state machine and the results of queries d1 to d5 are received.

e1) If the query for PHY/VPI/VCI was unsuccessful, proceed with step f).

e2) If an entry for PHY/VPI/VCI/AALx was not found, proceed with step f).

e3) If an entry for PHY/VPI/VCI/AAL5 was found, proceed with step g).

e4) If an entry for PHY/VPI/VCI/AAL2 was found, proceed with step h).

e5) If an entry for PHY/VPI/VCI/AALy was not found, proceed with step i).

f) Autoconfiguration:

f1) If the Payload Type Identifier PTI equals "001" or "011", a CRC 32 check is carried out across the entire payload. If this CRC 32 check is completed successfully, the channel is classed as AAL5. However, if this CRC 32 check fails, the channel is classed as AALy. If a new AAL5 or AALy channel was found, a new entry is created in the NSE 18. Said new entry comprises a new channel ID and the current time signal. Details on the time signal will be given with reference to FIG. 6. Processing continues with step g).

f2) If the Payload Type Identifier PTI equals "000", AAL2 is assumed and at least one criterion for AAL2 is checked:

the CRC5 check across the first CID determined by the OSF field is valid;

the parity check across the OSF field is valid;

the value of the UUI field of the first CID is smaller than 27;

the first CID field does not equal 0x00.

If at least one criterion, preferably all criteria, are fulfilled, the channel is classed as AAL2. In the NSE 18 an entry for a AAL2 (base) channel is generated, whereby the current time signal is once again also stored. Processing continues with step h).

f3) Unsuccessful autoconfiguration: If both step f1 and step f2) could not be completed successfully, the autoconfiguration has failed. The reason can be that the present cell is a cell in the middle of a longer AAL5 PDU (Protocol Data Unit) or a AAL2 PDU without a valid CID. The latter case can occur if the rest of the payload of a previous cell extends into the next cell. In this case, the cell is assigned a predeterminable designation. This may consist in that the status is undefined, whereby, for example, the designation AALy is assigned. Processing continues with step i).

g) Processing of an AAL5 cell:

g1) The NSE entry is updated using the current data (e.g. the newly configured AAL5 type and/or the current time signal);

g2) Thereafter, the cell is transferred to the DPR 24, which serves as an interface to the AAL reassembly device 26.

h) Processing of an AAL2 cell:

If a cell is recognised as being an AAL2 cell, all CIDs have to be found. Within a cell, up to 12 CIDs may be used. This takes place in a two-stage process:

h1) Determining all CIDs:

The main state machine 38 determines the first CID by evaluating the value of the OSF field. As the OSF field is always positioned at the same position of an ATM cell of the AAL2 type, it can easily be found and read out. This way, the first CID can be determined and a query PHY/VPI/VCI/CID1 addressed to the NSE 18. Subsequent CIDs are found by reading out the LI field of the first CID, which indicates the length of the data belonging to the first CID. This way, the offset and hence the position of the second CID CID2 can be found. In this process, the header of each CID undergoes a CRC5 check. After all CIDs of the current ATM cell have been found, step h2) is performed.

h2) Establishing a synchronisation with the result state machine;

If it was possible to find an entry for the relevant CID in the NSE and the CRC check was completed successfully, the ATM cell is passed on to the DPR 24 together with the channel ID determined. Also, the corresponding entry in the NSE is updated with the current time signal. If the query has not resulted in an entry, a new channel ID CH is created for this CID and a corresponding entry is made into the NSE; in addition, the associated time signal is stored in the NSE 18. Further details on the time signal will be given below with reference to FIG. 6.

i) 2nd step of autoconfiguration for AALy:

First, a test according to steps f1) and f2) is performed.

If AAL5 is now unequivocally found, AAL type 5 is configured.

If AAL2 is now unequivocally found, AAL type 2 is configured.

If neither AAL2 nor AAL5 are found, type AALy remains unchanged.

FIG. 5 shows in a schematic representation the principle of the query to the CAM memory of the NSE 18. In a register 52 there are given the data whose existence in table 54 is to be determined. In the register 52 a different selection of the specified elements can be defined as a query mask, for example PHY/VPI/VCI, PHY/VPI/VCI/AAL, PHY/VPI/VCI/CID, timer, etc. In the real enquiry, the abbreviations used for the register 52 are, of course, replaced by corresponding values. The channel ID CH of the entries determined is made available at the output 56 of the table 54. If no entry is determined for the query specified by register 52, a corresponding signal is made available a the output 56 of the table 54, e.g. CH=0.

Figure 6:
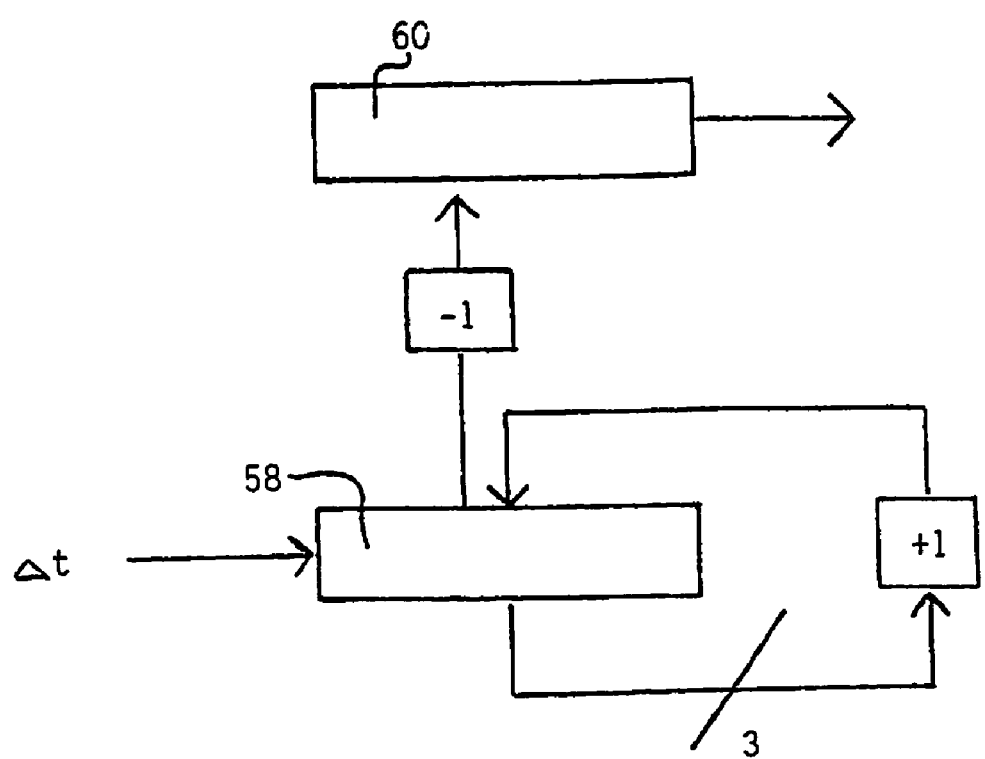
FIG. 6 is a schematic representation a device used for an embodiment of the measuring apparatus according to the present invention for providing a time signal that is stored in the table.

With reference to FIG. 6 there is described in the following the realisation of a timer, which enables the permanent monitoring of the transmission on ATM channels at the interface, even though the storage capacities of the CAM memory are, by nature limited. To this end, a timeout signal, i.e. a delete signal, needs to be generated for the channels for which there is an entry in the NSE 18, but which were not updated within a specified period and therefore have to be deleted. In this process, the counter position in register 58 is increased by 1 after each length of time Δt. In the present case, there is a 3-bit counter. When the maximum value is reached (111), the counter continues with the value 000 when there is the next clock pulse. An entry in register 58 is recorded as a time signal in the table stored in the CAM memory. Register 60 gives the counter position recorded in register 58, minus 1. Using this counter position given in register 60 there can be directed, at specified points in time, see FIG. 5, a query to the table 54, to determine all entries which have the counter position in register 60 entered as a time signal in the "Timer" column, in order to delete these. This is because these are the oldest entries recorded in the table 54, for which there has been no update for the longest time.

As used herein, and especially in the claims, the word "or" is inclusive, in the boolean logic sense, such that "or" can be one, either, or both.

It will be obvious to those having skill in the art that many changes may be made to the details of the above-described embodiments of this invention without departing from the underlying principles thereof. The scope of the present invention should, therefore, be determined only by the following claims.

What is claimed is:

1. A system for processing Asynchronous Transfer Mode (ATM) cells at an interface arranged between a first and a second node of a transmission system, in an order according to ATM channels comprising:
   a Content Addressable Memory (CAM); and
   an autoconfiguration unit coupled to the CAM, the autoconfiguration unit generating queries to the CAM and receiving results of queries from the CAM, the autoconfiguration unit further performing the steps of:
   a) determining address information for a specific ATM cell;
   b) verifying, whether the address information has already been recorded in a table, in which the address information is mapped onto a channel ID (CH), by providing the address information to CAM;
   b1) when the address information has already been recorded in the table:
      assigning the mapped channel ID (CH) from the CAM memory to the ATM cell for further processing;
   b2) when the address information has not yet been recorded in the table:
      indicating that the address information has not yet been recorded;
      assigning an available channel ID (CH) to the address information;
      recording said available channel ID (CH) and the address information in the table; wherein step b) uses a main state machine to generate a request to the CAM memory, and
   uses a result state machine to record the result of the request in step b1) and in step b2); and
   wherein the main state machine, the CAM memory and the result state machine are synchronized with each other to a common clock signal, whereby the main state machine generates a plurality of requests during a first group of clock cycles and applies the requests to the CAM memory, whereby the CAM memory makes results of the requests available to the result state machine during a second group of clock cycles, whereby a duration of the second group of clock cycles is longer than a duration of the first set of clock cycles; and c) providing the ATM cells, in an order according to channel IDs (CH) assigned to the ATM cells, for further processing.

2. The system according to claim 1, wherein the main state machine applies a request to the CAM memory at regular intervals within a predetermined period, whereby the result state machine collects the results made available by the CAM memory.

3. An apparatus to provide Asynchronous Transfer Mode (ATM) cells at an interface arranged between a first and a second node of a transmission system, in an order according to ATM channels comprising:
a processor;
a network search engine (NSE) connected to the processor, wherein the NSE comprises a Content Addressable Memory (CAM) that receives address information from the processor and provides a channel ID (CH) or a signal indicating that the address information has not yet been recorded in the CAM memory as an output;—and
a device for providing a time signal, said device comprising a time counter, which is designed to cyclically run through a predetermined value range to provide a counter value that is stored in the CAM memory together with the channel ID (CH) and the address information;
wherein the processor further comprises:
a main state machine to provide the address information to the CAM memory; and
a result state machine to receive the channel ID (CH) or the signal indicating that the address information has not yet been recorded in the CAM memory.

4. The apparatus accordingly to claim 3, wherein the processor is implemented using an a Field Programmable Gate Array (FPGA).

5. A method for determining at least one transmission parameter at an interface arranged between a first and a second node of a transmission system, whereby at the interface there occurs a plurality of transmissions on a plurality of Asynchronous Transfer Mode (ATM) channels comprising the steps of:
a) determining address information for a specific ATM cell received at an autoconfiguration unit;
b) verifying whether the address information has already been recorded in a table stored in a Content Addressable Memory (CAM), which maps a channel ID (CH) to the address information;
b1) when the address information has already been recorded in the CAM table, assigning a mapped channel ID (CH) according to the CAM table to the ATM cell for further processing;
b2) when the address information has not yet been recorded in the CAM table:
assigning an available channel ID (CH) to the address information;
determining the encoding rule used for encoding the ATM cell;
recording said available channel ID (CH), the address information and the encoding rule in the CAM table;

c) providing the ATM cells, in an order according to channel IDs (CH) assigned to the ATM cells, for further processing;
wherein determining the encoding rule, is accomplished by:
d) determining the Payload Type Identifier (PTI):
d1) when the PTI equals "001" or "011":
assigning the encoding rule ATM Adaption Layer 5 (AAL5);
d2) when the PTI equals "000":
assuming the encoding rule ATM Adaption Layer 2 (AAL2);
checking for fulfillment of at least one criterion for AAL2;
d21) when the at least one criterion for AAL2 is fulfilled: assigning the encoding rule AAL2;
d22) when the at least one criterion for AAL2 is not fulfilled:
assigning a predetermined designation ATM Adaption Layer "y" (AALy).

6. The method according to claim 5, wherein the criterion in step d21) are one or several of the following:
a cyclic redundancy check 5 (CRC5) across a first Channel Identifier (CID) determined by an Offset Field (OSF) field is valid;
the parity check across the OSF field is valid;
a value of a User-to-User Indication (UUI) field of the first CID is smaller than 27; or
the first CID field does not equal 0x00.

7. The method according to claim 5, wherein step d21) comprises the following steps:
d211) reading out an Offset Field (OSF) the field of the current ATM cell;
d212) reading out a first Channel Identifier (CID);
d213) reading out the first LI field and determining a new offset value; and
d214) reading out the data given by the first offset value and checking whether it is a second CID;
d215) when the second CID does not exist: terminating the analysis of the current ATM cell;
when the second CID does exist: determining the next offset value and reading out the next CID; and
d216) repeating steps d214) and d215) until all CIDs of the current ATM cell have been found.

8. The method according to claim 5, wherein the CAM table is realized as an network search engine (NSE), whereby the AAL type found is stored in the NSE together with the channel ID (CH) assigned to the ATM cell and the address information.

9. A method for the continuously providing Asynchronous Transfer Mode (ATM) cells at an interface arranged between a first and a second node of a transmission system, in an order according to ATM channels, comprising the steps of:
a) determining address information for a specific ATM cell received at an autoconfiguration unit;
b) verifying whether the address information has already been recorded in a table stored in a Content Addressable Memory (CAM) in which each address information is mapped to a channel ID (CH);
b1) when the address information has already been recorded in the CAM table:
assigning the mapped channel ID (CH) according to the CAM table to the ATM cell for further processing;
b2) when the address information has not yet been recorded in the CAM table:
assigning an available channel ID (CH) to the address information; and recording said available channel ID (CH) and the address information in the CAM table;

c) incrementing a counter after each predetermined time period to produce a counter value and storing the counter value in the CAM table together with the channel ID (CH) assigned to the ATM cell and the address information; and d) providing the ATM cells, in an order according to the channel IDs (CH) assigned to the ATM cells, for further processing;

wherein at predetermined points in time, especially prior to storing the channel ID (CH) assigned to the ATM cell, the address information and the current counter position, all entries having a specified counter value are deleted.

10. The method according to claim 9, wherein the CAM table is implemented using a network search engine (NSE).

11. The method according to claim 9, further comprising deleting the entries having a specific counter position comprises the steps of:

generating a query mask for the CAM memory, which contains at least the specific counter value;

finding all entries having the specific counter value in the CAM memory; and deleting all entries found having the specific counter value.

12. The method according to one of claim 11, wherein the specific counter value is a current counter value minus one.

\* \* \* \* \*